United States Patent [19]

Russell

[11] Patent Number: 4,936,614
[45] Date of Patent: Jun. 26, 1990

[54] REUSABLE BOTTLE HANDLE

[76] Inventor: Walter L. Russell, 9122 Birch La., Wichita, Kans. 67212

[21] Appl. No.: 402,233

[22] Filed: Sep. 5, 1989

[51] Int. Cl.⁵ .............................................. B65D 23/10
[52] U.S. Cl. ................................ 294/27.1; 215/100 A; 294/31.2
[58] Field of Search ................ 294/27.1, 28, 29, 31.1, 294/31.2, 33, 145; 16/114 R, 114 A; 215/100 R, 100 A, 101; 220/85 H, 94 R, 94 A, 96; 222/465.1, 475, 475.1, 567, 570; D7/70

[56] References Cited

U.S. PATENT DOCUMENTS

| | | | |
|---|---|---|---|
| 3,171,574 | 3/1965 | Simms | 222/467 |
| 3,807,594 | 4/1974 | Zimmermann et al. | 215/100 A X |
| 3,990,596 | 11/1976 | Hoftman | 294/33 X |
| 4,140,251 | 2/1979 | Karlen | 222/475.1 |
| 4,273,246 | 6/1981 | Thompson | 215/100 A |
| 4,379,578 | 4/1983 | Schuler | 294/31.2 |
| 4,456,135 | 6/1984 | Beekes | 294/27.1 X |
| 4,768,403 | 9/1988 | Bar-Noy | 294/31.2 X |
| 4,773,549 | 9/1988 | Avraham | 294/27.1 X |
| 4,821,372 | 4/1989 | Casiello | 294/27.1 X |
| 4,865,208 | 9/1989 | Lax et al. | 215/100 A |

FOREIGN PATENT DOCUMENTS 8302101  6/1983  World Int. Prop. O. ......... 294/27.1

Primary Examiner—Johnny D. Cherry
Attorney, Agent, or Firm—Edward L. Brown, Jr.

[57] ABSTRACT

A rigid reusable handle for lifting, carrying and pouring soft plastic soft drink bottles having an annular neck flange comprising a hand-gripping portion and an engaging portion, the engaging portion including two adjacent bores which substantially correspond with the bottle flange diameter, the two bores being offset from each other so that rotation of the handle about the bottle causes the bottle flange to move laterally from the first bore to the second bore whereby rotating movement of the handle is resisted by the free end of the handle deflecting the side wall of the bottle to retain the handle in its engaging position.

10 Claims, 1 Drawing Sheet

U.S. Patent    Jun. 26, 1990    4,936,614
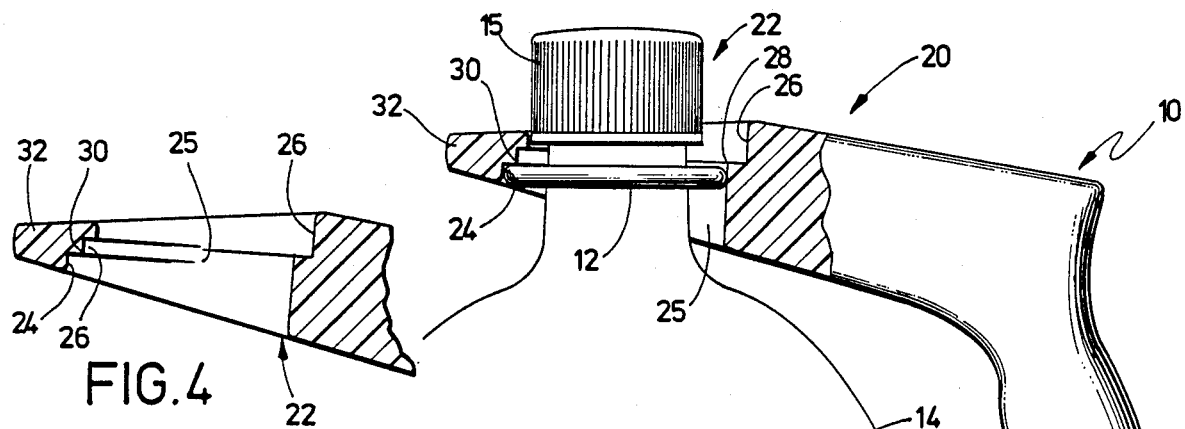
FIG.4
FIG.1
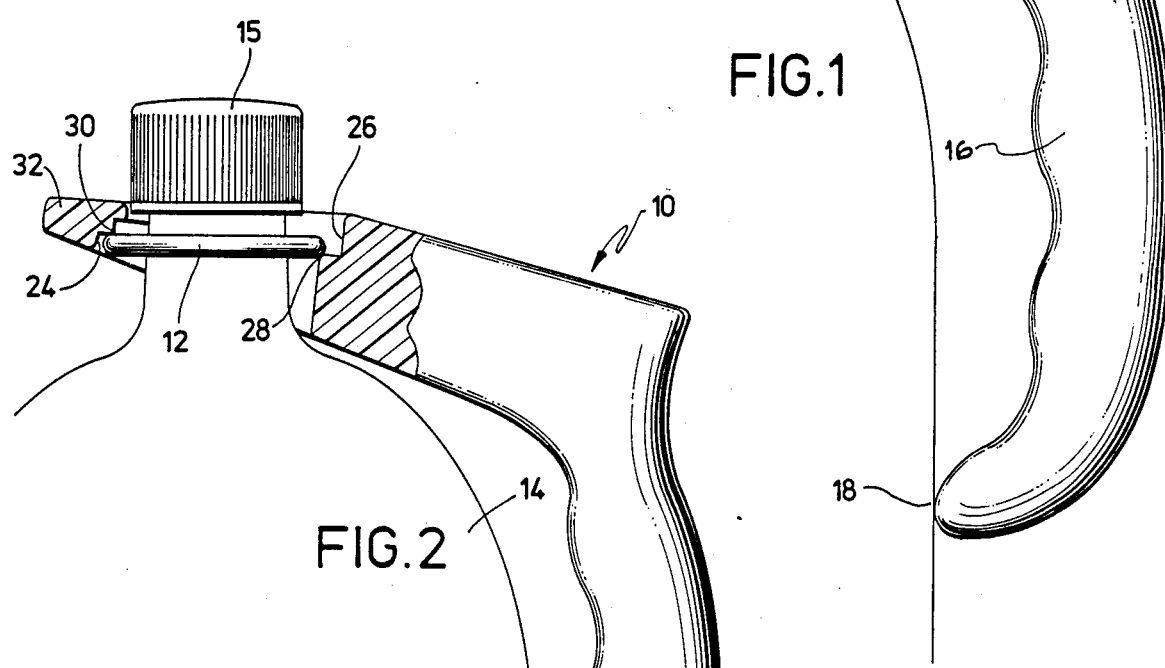
FIG.2
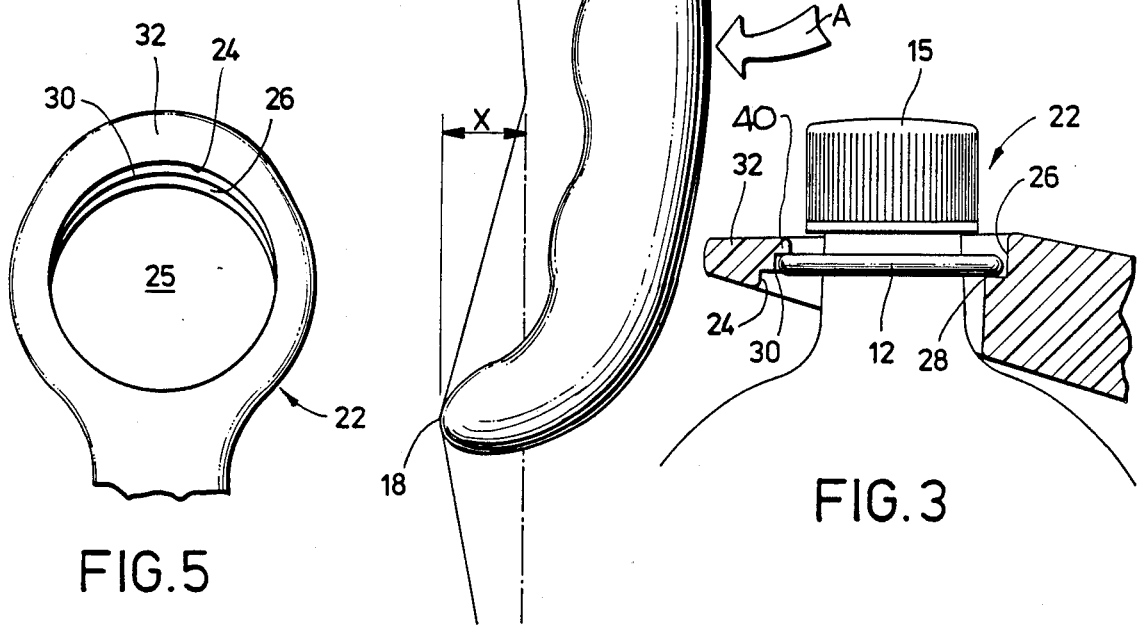
FIG.5
FIG.3

REUSABLE BOTTLE HANDLE

This invention relates to handles for lifting, supporting and pouring large plastic soft drink bottles having a neck flange approximate the end of the bottle. More particularly, the reusable handle can be quickly and easily snapped in place over the flange of the bottle providing a positive lock and removed as quickly in a similar manner thus providing a handle for lifting and pouring a substantial bottle.

BACKGROUND OF THE INVENTION

In recent years the soft drink industry has moved from glass to plastic bottles of 1-liter and 2-liter size. These plastic bottles are impact-resistant, lighter in weight and less costly than previously glass bottles. As a result of their size, the larger bottles become quite heavy and are difficult to manage and pour, thus providing a need for some type of handle. To form a handle integral with the thin-walled plastic bottle would not be practical for a variety of reasons and has not been done. Likewise the blow-forming method of manufacture of these bottles does not lend itself to an integral handle; however, it does require in its construction a flange on the neck of the bottle which provides some degree of structural integrity aside from its initial bottle-forming function.

Due to the large size of a 2-liter bottle, without a handle, pouring requires using two hands. This, of course, leaves the glass in a precarious position and it would be much more desirable to be able to lift and pour this large and resilient bottle with a single hand. This problem of grasping and pouring is of particular significance with small children and frequently these large bottles have slipped from the hands of the user while being transported to and from the refrigerator as well as during pouring.

A search of the prior art disclosed the following patents which applicant feels are most pertinent to the present invention:

| U.S. PAT. NO. | INVENTOR | ISSUED |
| --- | --- | --- |
| 4,821,372 | Casiello | April 18, 1989 |
| 4,773,549 | Avraham | September 27, 1988 |
| 4,768,403 | Bar-Noy | September 6, 1988 |
| 4,486,043 | Rais | December 4, 1984 |
| 4,456,135 | Beekes | June 26, 1984 |
| 4,379,578 | Schuler | June 26, 1984 |

The patents to Rais and Schuler teach a type of handle which grips the bottle around the neck and around the middle of the bottle with the hand-gripping portion in between.

The patent to Beckes teaches a handle which grips only the flange of the bottle and utilizes a rather complex structure for engaging and holding the flange.

The patent to Casiello teaches a relatively simple structure which snaps in place on the neck flange which appears to be a rather precarious connection for a cantilevered handle of this nature.

The patent to Avraham illustrates another handle structure with two-point contact for engaging the neck of the bottle just below the flange and in its midsection. The gripping structure is substantially different from the present invention.

The patent to Bar-Noy teaches a handle structure which splits open and surrounds the neck flange of the bottle as well as providing a function for removing the cap. The structure is different and substantially more complex than the present invention.

Some of the just mentioned prior handles are not sufficiently attached to the bottle with a single attachment point to be reliable while others have handles which are poorly positioned and are not space-efficient when stored in a crowded refrigerator.

It is therefore the principal object of the present invention to provide a relatively simple single-point attachment handle with a secure and positive grip on the bottle.

Another object of the present invention is to create a reusable handle which is easy to attach and remove while being durable and inexpensive to manufacture without having any movable parts.

Another object of the present invention is to create a handle which is space-efficient when stored or while being comfortable to lift and pour with.

Other objects and features of the invention will become apparent to those skilled in the art from the following specification when read in light of the annexed drawings.

SUMMARY OF THE INVENTION

The reusable handle of the present invention utilizes two bores, one of which is slightly offset from the other, each of which essentially surround the neck flange on a universal 2-liter soft drink bottle. The handle includes a hand-gripping portion, the end of which contacts the side wall of the bottle and restricts the rotational movement of the handle which is necessary for engagement of the bottle flange. Engagement is achieved by rotating the handle so the bottle flange moves from the first bore to the second offset bore. To remove the handle once in the offset bore, the pouring end of the handle is pried upward causing the overall handle to rotate allowing the bottle flange to snap laterally back into the first bore, thus releasing the bottle.

DESCRIPTION OF THE DRAWINGS

FIG. 1 is a side view of the handle partially in section before engagement;

FIG. 2 is a similar view to FIG. 1 with the handle rotated and approaching its engaged position;

FIG. 3 is a similar view with the handle in its fully engaged position;

FIG. 4 is a partial section to an enlarged scale of the first and second engaging bores with the bottle removed; and FIG. 5 is a partial bottom view of the handle illustrating the offset nature of the bores.

DESCRIPTION OF THE PREFERRED EMBODIMENT

The reusable bottle handle is generally described by reference numeral 10, as seen in FIG. 1, and includes a hand-gripping portion 16, a middle portion 20 and engaging portion 22. The middle portion 20 provides a secondary lifting area which is positioned essentially horizontal in its mounted position. Located in the engaging portion 22 is an opening 25 therethrough, as best seen in FIGS. 4 and 5. Located in opening 25 is a first bore 24 which has an inside diameter slightly greater than the outside diameter of bottle flange 12 thus permitting easy and snug receipt of the bottle cap 15 and flange 12 through opening 25.

The soft drink bottle 14 is a standard 2-liter size and diameter having a neck flange 12 uniform in diameter and thickness. For the handle 10 of the present invention to properly engage and release the bottle 14, it is necessary that the diameters of the bottle and flange be substantially uniform since the offset position of handle end 18 controls the release and engaging rotation of the handle 10.

Positioned just above bore 24 is second bore 26 which is offset to the right, as viewed in FIGS. 1 through 4. Separating bores 24 and 26 are a pair of lips 28 and 30, on right and left sides, respectively, of the drawing as illustrated in FIG. 1.

Handle 10 is formed by injection molding from a rigid plastic, such as for example ABS, which has a small amount of flexibility therein allowing the end 18 of the handle to slightly flex with respect to the engaging portion 22 when in the engaged position. To engage the handle 10, the handle opening 25 is slid over the top 15 of the bottle and neck flange 12 until the flange 12 engages lip 30, as seen in FIG. 1. Bottle flange 12 is now snugly received in bore 24 and is restrained from any lateral movement. For the handle to engage bottle flange 12, it is necessary for flange 12 to move into offset bore 26, as seen in the FIG. 3 position. Before this can be accomplished, handle 10 must be rotated as illustrated in FIG. 2 so that the right hand edge of flange 12 rides up over lip 28 allowing flange 12 to move laterally and upward into the bore 26, into its engaged position. Lip 40, as seen in FIG. 3, limits any axial movement of flange 12 in bore 26. To achieve this rotation of the handle, as seen in FIG. 2, a force A is applied to the hand-gripping portion 16 which causes the bottle 14 to deflect a distance X. The force can most easily be applied downwardly on the middle portion 20 of the handle. The handle 10 is basically rotating about the left hand edge of bottle flange 12 and when the right edge of flange 12 passes over lip 28, the flange 12 will move or snap laterally into bore 26 in its engaged position (see FIG. 3). As the force A is removed from handle 10, the deflected side of the bottle will cause the handle to rotate back in a counterclockwise direction and the handle will assume the position shown in FIG. 3. With flange 12 in bore 26, the handle is completely engaged with lip 28 preventing the handle 10 from separating from the bottle.

To release or disengage handle 10, hand force is applied to pouring end 32 of the handle, as seen in FIG. 3, by prying the end upward so that the left hand edge of flange 12 can move downward and laterally into bore 24. To achieve this rotation, again handle 10 must be rotated, this time about the right hand edge of flange 12 which necessitates the end 18 of the handle to again deflect the side wall of the bottle a distance X, as shown in FIG. 2, sufficiently to allow the left hand edge of flange 12 to slide over lip 30 and snap into bore 24 whereupon handle 10 is fully released.

In the particular design of the handle 10, the moment arm distance from the handle end 18 to the outboard edge of bore 24, as seen in FIG. 2, is roughly four times the diameter of the bottle flange 12. Therefore, the deflection distance X of the bottle is approximately four times the thickness of flange 12 or the distance flange 12 must move to clear lip 28 or 30. These proportions may vary; however, the deflection X of the bottle side wall provides a biasing means to maintain handle 10 in its engaged position.

The handle in its engaged position can be rotated 360° around the bottle.

It should be understood that the foregoing relates to only the preferred embodiment of the invention and that numerous modifications or alterations made be made therein without departing from the spirit and scope of the invention as set forth in the claims.

I claim:

1. A reusable bottle handle which engages and releases flexible bottles having sides and an annular neck flange comprising:
    a hand-gripping portion having a free end which engages the side of the bottle;
    an engaging portion extending from the hand-gripping portion, including an opening therethrough;
    a first bore means located in said opening having an outboard edge with a diameter approximate to that of the bottle flange for receiving the bottle flange, and
    a second bore means of like diameter to the first bore means in the opening positioned above the first bore means and axially offset toward the hand-gripping portion to engage and hold the bottle neck flange, the flange must pass from the first to the second bore means by rotation of the handle about the outboard edge of the first bore means whereby the free end of the hand-gripping portion deflects the side of the bottle and allows the flange to move laterally into the second bore means.

2. A reusable bottle handle as set forth in claim 1, including an inboard edge on the second bore means, an end means on the engaging portion of the handle which can be manually gripped and pried upward causing the handle to rotate about said inboard edge of the second bore means and allowing the bottle flange to move laterally from the second bore means to the first bore means and release the bottle.

3. A reusable bottle handle as set forth in claim 1 including a lip means between the two offset bore means over which the bottle flange snaps during movement between the two bore means.

4. A reusable bottle handle as set forth in claim 1, including a middle portion in the handle between the hand-gripping portion and the engaging portion which extends substantially laterally from the bottle axis when engaged and provides a secondary hand-lifting area.

5. A reusable bottle handle as set forth in claim 1, including an end means on the engaging portion which extends in the opposite direction from that of the hand-gripping portion which can be manually gripped and pried upward causing the handle to rotate deflecting the side of the bottle and allowing the bottle flange to move laterally from the second bore means to the first bore means and release the bottle.

6. A reusable bottle handle as set forth in claim 1, wherein the first and second bore means are offset from each other approximate the thickness of the bottle flange defining a lip means therebetween over which the flange snaps during movement between the two bore means.

7. A reusable bottle handle as set forth in claim 1, wherein the free end of the hand-gripping portion which deflects the side of the bottle has a moment arm from the outboard edge of the first bore means which is at least three times greater than the diameter of the bottle flange whereby releasing the flange from the second bore means requires a deflection of the side of the bottle substantially greater than the flange thickness.

8. A reusable bottle handle which engages and releases bottles having an annular neck flange comprising:
  a hand-gripping portion having a free end which engages the side of the bottle;
  an engaging portion extending from the hand-gripping portion, including an opening therethrough;
  a first bore means located in said opening having an outboard edge with a diameter approximate to that of the bottle flange for receiving the bottle flange, and
  a second bore means of like diameter to the first bore means in the opening positioned above the first bore means and axially offset toward the hand-gripping portion to engage and hold the bottle neck flange, the flange must pass from the first to the second bore means by rotation of the handle about the outboard edge of the first bore means.

9. A reusable bottle handle as set forth in claim 1, including a lip means in the second bore means which prevents any axial movement of the engaged bottle flange in the second bore means.

10. A reusable bottle handle as set forth in claim 1 wherein the first and second bore means along with the bottle flange are circular, permitting the handle to freely rotate on the bottle in the engaged position.

* * * * *